(12) United States Patent
Yim

(10) Patent No.: US 9,185,300 B2
(45) Date of Patent: Nov. 10, 2015

(54) PHOTOGRAPHING APPARATUS FOR SCENE CATERGORY DETERMINATION AND METHOD FOR CONTROLLING THEREOF

(71) Applicant: SAMSUNG ELECTRONICS CO., LTD., Suwon-si (KR)

(72) Inventor: Hyun-ock Yim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 14/082,389

(22) Filed: Nov. 18, 2013

(65) Prior Publication Data

US 2014/0139699 A1    May 22, 2014

(30) Foreign Application Priority Data

Nov. 19, 2012   (KR) .................. 10-2012-0130976

(51) Int. Cl.
*H04N 5/228* (2006.01)
*H04N 5/222* (2006.01)
*H04N 5/232* (2006.01)

(52) U.S. Cl.
CPC ....... *H04N 5/23293* (2013.01); *H04N 5/23222* (2013.01); *H04N 5/23232* (2013.01)

(58) Field of Classification Search
CPC .......... H04N 5/23232; H04N 5/23235; H04N 5/23293; H04N 1/2112; H04N 1/2125
USPC ................... 348/222.1, 231.99, 231.1, 231.2, 348/333.01
See application file for complete search history.

(56) References Cited

U.S. PATENT DOCUMENTS

| 6,792,203 | B1 | 9/2004 | Ide et al. | |
|---|---|---|---|---|
| 8,089,523 | B2 | 1/2012 | Miyata | |
| 2007/0065137 | A1 | 3/2007 | Hara et al. | |
| 2007/0288973 | A1 | 12/2007 | Glatron et al. | |
| 2008/0079834 | A1 | 4/2008 | Chung et al. | |
| 2009/0066803 | A1 | 3/2009 | Miyata | |
| 2009/0244311 | A1 | 10/2009 | Eom et al. | |
| 2010/0110229 | A1 | 5/2010 | Chung et al. | |
| 2010/0194931 | A1* | 8/2010 | Kawaguchi et al. | 348/240.99 |
| 2010/0259634 | A1* | 10/2010 | Goh | 348/222.1 |
| 2010/0277609 | A1* | 11/2010 | Abe | 348/222.1 |
| 2011/0007177 | A1* | 1/2011 | Kang | 348/222.1 |

(Continued)

FOREIGN PATENT DOCUMENTS

| JP | 2001-238177 A | 8/2001 |
|---|---|---|
| JP | 2002-190984 A | 7/2002 |

(Continued)

OTHER PUBLICATIONS

PCT Search Report and Written Opinion issued for PCT/KR2013/010517 (Mar. 12, 2014).

*Primary Examiner* — Kelly L Jerabek
(74) *Attorney, Agent, or Firm* — Drinker Biddle & Reath LLP

(57) ABSTRACT

A photographing apparatus is disclosed. The photographing apparatus includes a determination unit which determines a scene category to which an input image belongs from a plurality of predetermined scene categories, a photographing unit which photographs the input image, a control unit which controls the photographing unit to generate an original image corresponding to the input image and an additional image where image processing corresponding to the determined scene category has been performed on the input image, and a display unit which displays the generated original image and additional image according to a predetermined event.

16 Claims, 10 Drawing Sheets

(56) References Cited

U.S. PATENT DOCUMENTS

| | | |
|---|---|---|
| 2011/0074971 A1* | 3/2011 | Kwon ................ 348/222.1 |
| 2011/0221924 A1* | 9/2011 | Kuma ................ 348/222.1 |
| 2011/0228129 A1 | 9/2011 | Miyata |
| 2011/0317026 A1* | 12/2011 | Shibazaki ........... 348/222.1 |
| 2012/0069210 A1 | 3/2012 | Miyata |

FOREIGN PATENT DOCUMENTS

| | | |
|---|---|---|
| JP | 2009-070099 A | 4/2009 |
| JP | 2009-232325 A | 10/2009 |
| KR | 10-2008-0030884 A | 4/2008 |
| KR | 10-0985693 B1 | 10/2010 |
| KR | 10-1081629 B1 | 11/2011 |

* cited by examiner

FIG. 3
(a)
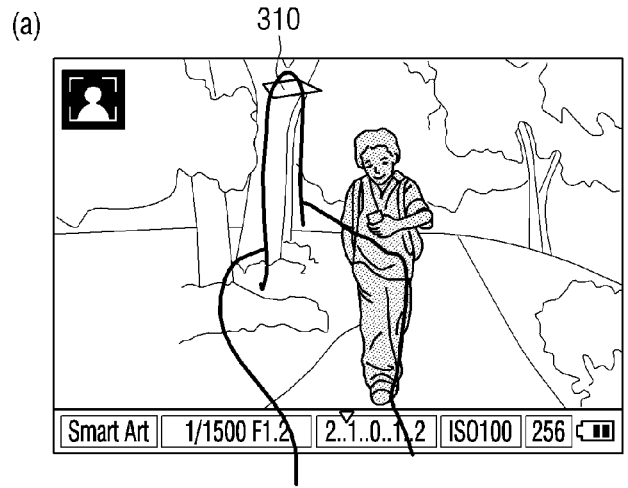
(b)
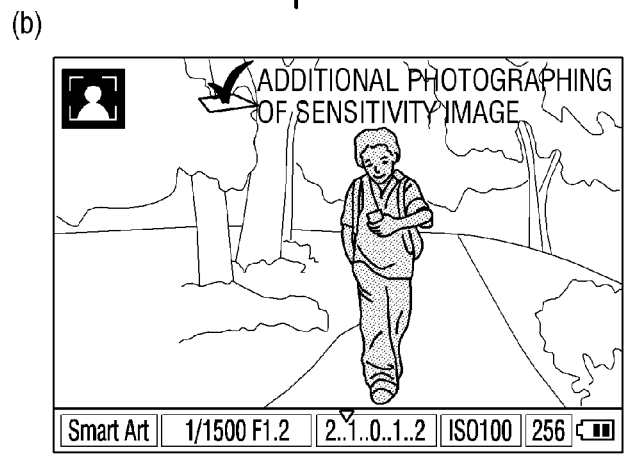
(c)
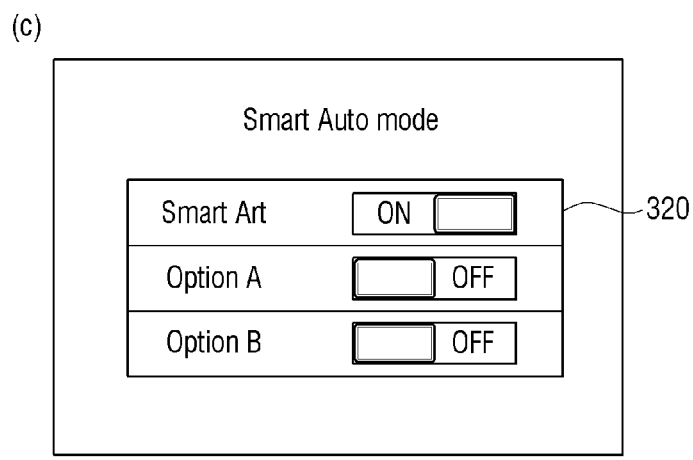

FIG. 4
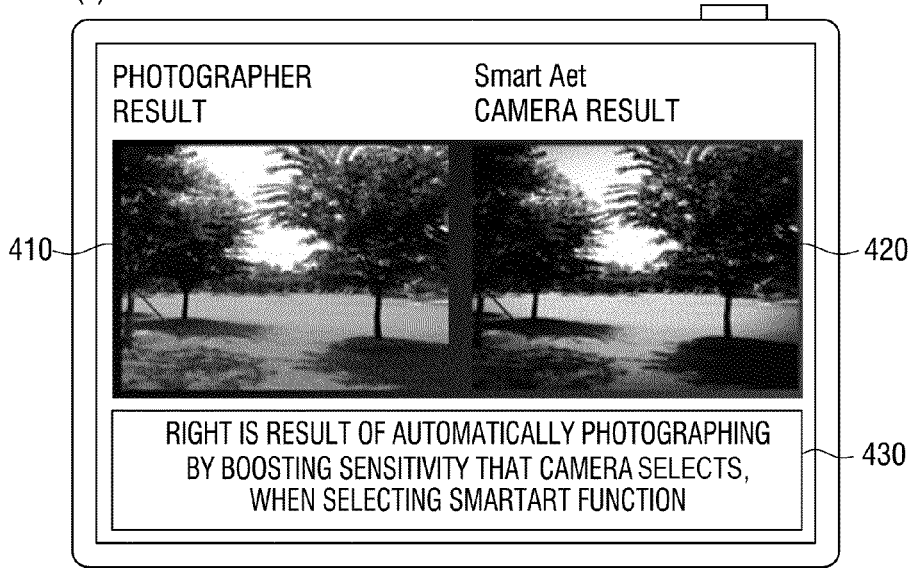
(a)
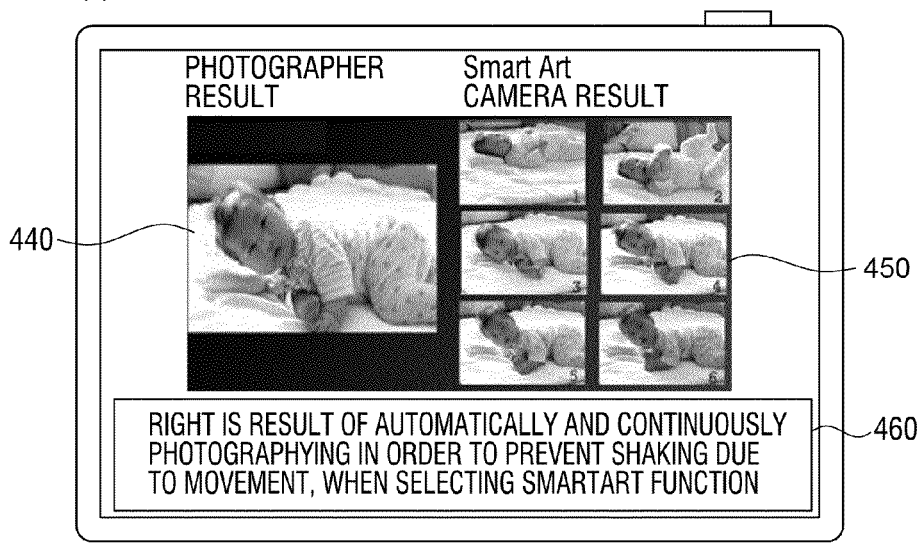
(b)

FIG. 5
(a)
(b)
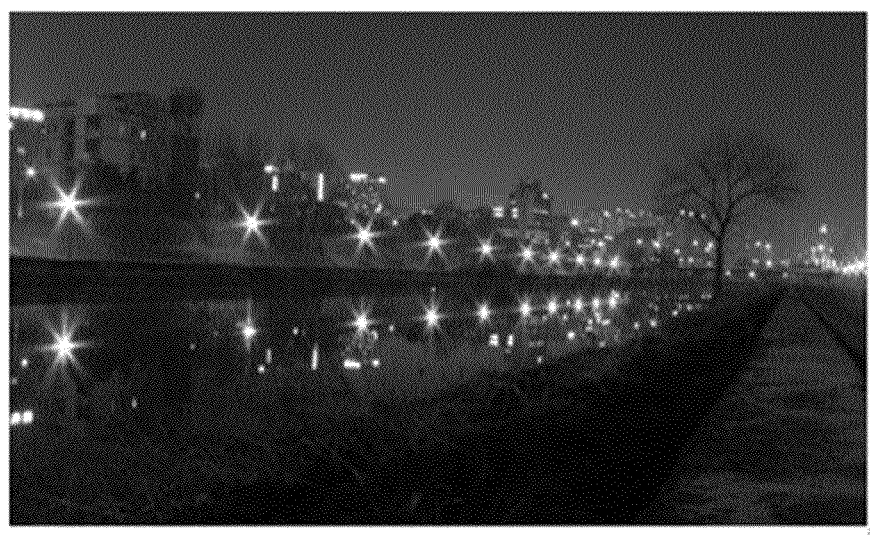

FIG. 6
(a) 
(b) 
(c) 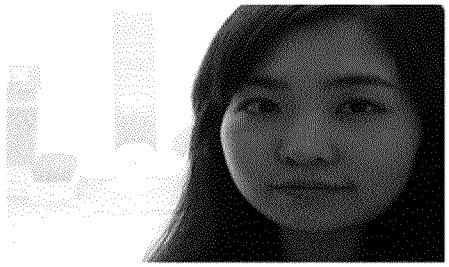
(d) 

PHOTOGRAPHING APPARATUS FOR SCENE CATERGORY DETERMINATION AND METHOD FOR CONTROLLING THEREOF

CROSS-REFERENCE TO RELATED APPLICATIONS

This application claims priority from Korean Patent Application No. 2012-0130976, filed on Nov. 19, 2012, the disclosure of which is incorporated herein by reference.

BACKGROUND

1. Field

Methods and apparatuses consistent with the exemplary embodiments relate to a photographing apparatus and method for controlling thereof, and more particularly to a photographing apparatus which recognizes a photographing scene and performs photographing, and a control method thereof.

2. Related Art

Currently, numerous processing technologies are utilized to supplement existing image processing methods according to a current photographing operation. But since different users have different preferences, and due to side effects of the processing technologies, users must select the corresponding technologies manually.

For these reasons, problems arise when users who do not have information on the processing technology become unable to use the technology. Thus, as the types of processing technologies increases, the menu selections users must navigate also get more complicated, which keeps the users from using the technology even when they want to.

In addition, in a case of lens effect, which provides a user with an image having different effects from that of a normal image through a filter, even though the user can use it in app programs on mobile phones and in PC image editing programs, the lens effect is only provided in manuals since it can excessively distort existing images. Accordingly, the user has to photograph and then apply the filter to achieve the lens effect, or the user has to use a menu to select a filter for achieving the effect from the numerous filters before photographing. Here, if a user who has no knowledge of the filters, then the user spends even more time and effort.

In addition, when continuously photographing a baby or pet that moves, by reducing the shutter speed, it is possible to obtain an image where the movement has been somewhat corrected. But in such a case, the user may not know how to take photographs continuously, or when the camera is set in a continuous photographing mode, numerous photographs may be taken regardless of the conditions causing problems in photographing time and storage memory, and thus not used frequently.

SUMMARY

Various exemplary embodiments relate to a photographing apparatus which generates an additional image by automatically applying an appropriate IP (Image Processing) technology according to characteristics of an input image and a photographing method thereof.

According to an exemplary embodiment of the present disclosure, a photographing apparatus includes a determination unit which determines a scene category to which an input image belongs from a plurality of predetermined scene categories; a photographing unit which photographs the input image; a control unit which controls the photographing unit to generate an original image corresponding to the input image and an additional image where image processing corresponding to the determined scene category has been performed on the input image; and a display unit which displays the generated original image and additional image according to a predetermined event.

In addition, the control unit may control the photographing unit to generate the additional image by photographing the input image according to an image processing setting corresponding to the determined scene category.

In addition, the control unit may control the photographing unit to generate the additional image by performing image processing corresponding to the determined scene category on the original image.

In addition, the control unit may control the photographing unit to generate a plurality of additional images by determining a number of the plurality of additional images, and performing different image processing corresponding to the determined scene category to each additional image of the plurality of additional images, respectively.

In this case, the number the plurality of additional images may be either predetermined or automatically determined based on a number of different image processing settings corresponding to the determined scene category.

In addition, the photographing apparatus may further include a counting unit which counts a number of additional images that have been deleted, where based on the counted number, the control unit may set a priority order for performing image processing when generating the additional image corresponding to the determined scene category in a next photographing operation.

In addition, the control unit may set the priority order for performing image processing such that a higher counted number corresponds to a lower priority.

In addition, the determination unit may analyze the input image in a live view mode, and determines the scene category to which the input image belongs.

In addition, the display unit may display the generated original image and additional image together in a playback mode.

According to another exemplary embodiment of the present disclosure, a photographing method may include determining a scene category to which an input image belongs from a plurality of predetermined scene categories; generating an original image corresponding to the input image through photographing and an additional image where image processing corresponding to the determined scene category has been performed on the input image; and displaying the generated original image and additional image according to a predetermined event.

In addition, the generating of the additional image may include photographing the input image according to an image processing setting corresponding to the determined scene category.

In addition, the generating of the additional image may include performing image processing corresponding to the determined scene category on the original image.

In addition, the generating of the additional image may include determining a number of a plurality of additional images, and performing different image processing corresponding to the determined scene category to generate the plurality of additional images.

In this case, the number of the plurality of additional image may be either predetermined or automatically determined based on a number of different image processing settings corresponding to the determined scene category.

In addition, the photographing method may further include counting a number of additional images that have been deleted, and based on the counted number, setting a priority order for performing image processing when generating the additional image corresponding to the determined scene category in a next photographing operation.

The priority order for performing image processing may be set such that a higher counted number corresponds to a lower priority.

In addition, the determining the scene category may include analyzing the input image in a live view mode, and determining the scene category to which the input image belongs.

In addition, the displaying may include displaying the generated original image and additional image together in a playback mode.

According to the aforementioned various exemplary embodiments of the present disclosure, it is possible to provide images where an appropriate IP (Image Processing) technology has been applied according to the characteristics of the input image.

BRIEF DESCRIPTION OF THE DRAWINGS

The above and/or other aspects of the present disclosure will become more apparent by describing the present disclosure with reference to the accompanying drawings, in which:

FIG. 3 is a set of diagrams illustrating a UI provision method, according to an exemplary embodiment of the present disclosure;

FIG. 4 is a set of diagrams illustrating a method for providing an additional image, according to an exemplary embodiment of the present disclosure;

FIGS. 5 to 8 are diagrams illustrating a photographed result, according to various exemplary embodiments of the present disclosure;

DETAILED DESCRIPTION

Certain exemplary embodiments are described in more detail below with reference to the accompanying drawings.

Figure 1:
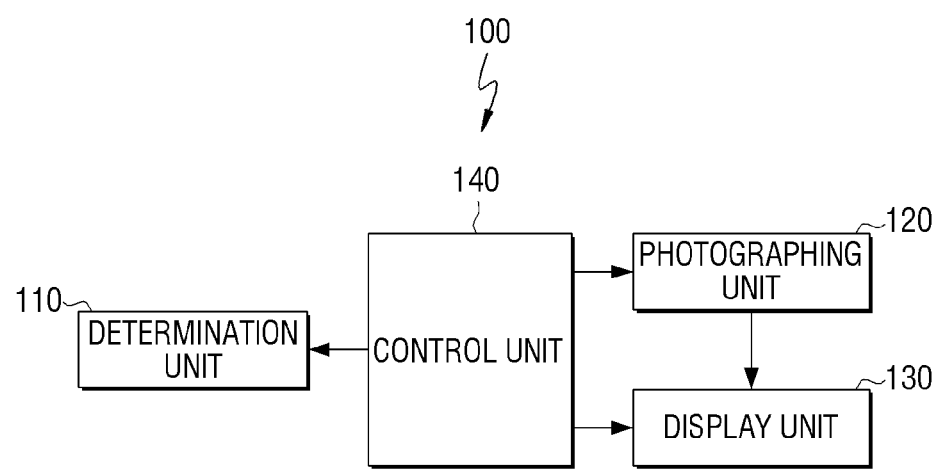
FIG. 1 is a block diagram illustrating a configuration of a photographing apparatus, according to an exemplary embodiment of the present disclosure.

FIG. 1 is a block diagram illustrating a configuration of a photographing apparatus 100, according to an exemplary embodiment of the present disclosure.

As illustrated in FIG. 1, the photographing apparatus 100 includes a determination unit 110, photographing unit 120, control unit 140 and display unit 130. The photographing apparatus 100, which includes such a configuration, may be embodied as a digital camera or a camcorder, for example, a DSC (Digital Still Camera) and DSLR (Digital Single Lens Reflex) camera, but is not limited thereto. The photographing apparatus 100 may also be embodied as an apparatus having a photographing function, for example, a smart phone, digital TV, and computer.

The determination unit 110 determines a scene category to which an input image belongs. More specifically, the determination unit 110 may analyze the input image and determine a category to which the input image belongs from a plurality of predetermined scene categories. That is, even when photographing is not performed, the photographing apparatus 100 may provide a live view function that displays an input image on a screen provided on a main body, and the determination unit 110 may analyze the input image provided for live view and determine a scene category to which the input image belongs.

Herein, the plurality of scene categories may be categories classified according to a scene characteristic of an image, and thus may include portrait, night, motion, landscape, and other scene categories, but is not limited thereto. For example, a scene category may be classified in various ways, such as Adjusted Backlight, Beautiful Night, Motion, Romantic Sunset, Beauty Portrait, Sensitive Landscape, Mood White, Beautiful Scenery, Closeup, Normal, etc.

Meanwhile, the determination unit 110 may analyze the input image in various ways and determine a corresponding scene category to which the input image belongs.

For example, using a gyro sensor or other detection device, the determination unit 110 may determine that the input image belongs to a motion category when a level or a certain value occurs in a hardware, or may determine that the input image belongs to a motion category using software when a input value of two or more images input in real time is different.

In addition, the determination unit 110 may determine whether or not the image input belongs to a night category based on the EV (Exposure Value) calculated by the photographing apparatus 100. Here, the EV may be a brightness value of a currently input image calculated by the photographing apparatus 100 using a mathematical formula 1 presented below.

$$EV = Tv + Av \quad \text{[Mathematical formula 1]}$$

Here, Tv is a Time value, for example, a shutter speed value of ½ s, 1/125 s, etc., and Av is an aperture value, for example, F2.8, F5.6, etc.

For example, in a case where the EV is at or below level 5, the determination unit 110 may determine that an input image belongs to a night category.

In addition, the determination unit 110 may determine whether or not an input image belongs to a portrait category using face recognition technology.

The photographing unit 120 photographs an input image and generates a photographing image.

More specifically, the photographing unit 120 may generate a data signal of an image from an input light, and convert the generated data signal into digital image data.

In addition, the photographing unit 120 may perform digital signal processing of gamma correction and white balance adjustment, etc., on an image from input light, and convert the generated data signal into digital image data.

Furthermore, the photographing unit 120 may perform digital signal processing such as gamma correction and white balance adjustment, etc., on the digital image data, and provide the processed digital image data to the display unit 130. Specific configurations and operations of the photographing unit 120 will be explained below with reference to FIG. 2.

The display unit 130 displays image data generated by the photographing unit 120.

In addition, the display unit 130 displays an input image through a live view function. Furthermore, the display unit 130 may display a menu and icons, which may represent a setting change and operation state (for example, residual battery quantity) of the photographing apparatus 100.

The control unit 140 controls the overall operations of the photographing apparatus 100.

Specifically, the control unit 140 may control the photographing unit 120 to generate an original image of the input image and an additional image where image processing corresponding to the scene category determined in the determination unit 110 has been performed on the input image. Herein, image processing may include everything from performing a change of photographing setting before photographing to performing post-processing after photographing.

Meanwhile, image processing technology corresponding to the scene category may be predetermined by combining at least one image processing technology in various formats according to characteristics of each scene category. For example, in the case of a motion category, it is possible to apply an image processing technology which enables vivid photographing of a moving photographing subject. In the case of a portrait category, it is possible to change the photographing mode into a person photographing mode, which may automatically create a bright and optimal state for photographing a person. In addition, in the case of a backlight portrait category, where it is determined that a person is included in a bright background, it is possible to adjust exposure, sensitivity flash, and other settings so that the person is not photographed to look dark. Specifically, when there is a big difference between the light portion and dark portion, it is possible to apply the image processing technology of ACB (Auto Contrast Balance), which reduces such a difference and expresses the darker portion as bright and vivid. In addition, in the case of a night portrait category, where a person is detected under a nightscape condition, it is possible to apply an image processing technology of adjusting the exposure, flash, and other settings of the person to express the person in an optimal state. In the case of a landscape category, it is possible to apply an image processing technology of making the screen more vivid and increasing the overall chroma, thereby emphasizing the color of the scene. In addition, in the case of a backlight category, it is possible to adjust the settings such that the photographing subject in the front does not appear darker in the backlight by using the ACB function as the backlit portrait function, thereby increasing the definition. In the case of a night category, it is possible to adjust the setting of the camera such that the camera does not shake while not using the flash to emit light in a nightscape photographing. And in the case of a Tripod category, it is possible to adjust the setting of the camera such that the camera automatically recognizes whether or not a Tripod is installed. If a Tripod is installed, since there is no concern that the Tripod will shake, it is possible to enable a low speed shutter speed as well. In addition, in case of a white category, that is, when some white is included in the screen, it is possible to apply the image processing technology of expressing the background to appear brighter.

Specific examples of the image processing technologies corresponding to each scene category are as presented below.

TABLE 1

| | Smart Art Category | Smart Art Processing (ELECT AND APPLY A PRIORITY ORDER, OR CREATE A PLURALITY OF IMAGES) |
|---|---|---|
| 1 | Adjusted Backlight | (AUTOMATIC FUNCTION MAPPING) HDR (High Dynamic Range) |
| | | (IMAGE PROCESSING TECHNOLOGY) Saturation ↓ + Skin Color ADJUSTMENT + BRIGHTNESS ADJUSTMENT |
| | | (IMAGE PROCESSING TECHNOLOGY) Black & White |
| 2 | Beautiful Night | (AUTOMATIC FUNCTION MAPPING) MFNS or LLS |
| | | (IMAGE PROCESSING TECHNOLOGY)Cross filter + Saturation ↓ |
| 3 | Motion | (AUTOMATIC FUNCTION MAPPING) CONTINUITY |
| 4 | Romantic Sunset | (IMAGE PROCESSING TECHNOLOGY)F.num ↓ + color ↑ + contrast ↑ |
| | | (IMAGE PROCESSING TECHNOLOGY) Vignetting |
| 5 | Beauty Portrait | (AUTOMATIC FUNCTION MAPPING) Beauty shot, Beauty palette (+out focusing) |
| | | (IMAGE PROCESSING TECHNOLOGY)Soft focus (+ out focusing) |
| | | (IMAGE PROCESSING TECHNOLOGY)Vignetting (+ out focusing) |
| 6 | Sensitive Landscape | (IMAGE PROCESSING TECHNOLOGY)Saturation ↑ + EV ↓ (+Green ↑ or Blue ↑) |
| | | (IMAGE PROCESSING TECHNOLOGY) Vignetting |
| 7 | Mood White | (IMAGE PROCESSING TECHNOLOGY) Saturation ↓ |
| | | (IMAGE PROCESSING TECHNOLOGY) Foggy |
| | | (IMAGE PROCESSING TECHNOLOGY) Black & White |
| 8 | Beautiful Scenery | (IMAGE PROCESSING TECHNOLOGY) Vignetting |
| | | (IMAGE PROCESSING TECHNOLOGY) Saturation ↑ + EV ↓ |
| | | (IMAGE PROCESSING TECHNOLOGY) Foggy |
| | | (IMAGE PROCESSING TECHNOLOGY) Vintage |
| 9 | Closeup | (IMAGE PROCESSING TECHNOLOGY) Vignetting + DEPTH |
| | | (IMAGE PROCESSING TECHNOLOGY) Saturation ↑ + DEPTH + Sharpness ↑ |
| 10 | Normal | (IMAGE PROCESSING TECHNOLOGY) Vignetting |
| | | (IMAGE PROCESSING TECHNOLOGY) Vintage |

However, table 1 is merely an exemplary embodiment, and thus various other types of scene categories and various other types of image processing technologies corresponding to each scene category may be used.

In the first photographing operation, the control unit 140 may photograph the input image under the existing conditions, and control the photographing unit 120 to perform photographing to generate an additional image where image processing corresponding to the scene category has been performed on the input image. That is, the control unit 140 may create an original image, and then change the photographing setting to enable image processing corresponding to the scene category, and generate an additional image. For example, the control unit 140 may adjust the degree of exposure, and create an additional image through additional photographing.

In addition, the control unit 140 may post-process the original image based on the scene category corresponding to the input image to create an additional image. For example, the control unit 140 may perform blurring on the original image to create the additional image.

In addition, the control unit 140 may determine the number of additional images to be generated, and may control to the photographing unit 120 to generate the determined number of additional images.

More specifically, the control unit 140 may determine the number of the additional images to be generated based on the number of the image processing technologies corresponding to each scene category, and may generate the additional images by applying the image processing technologies belonging to the corresponding scene category.

Otherwise, it is possible to set the number of additional images to be generated for all scene categories to be the same, or the number for each scene category may be different, or the number may be designated by the user. For example, the number of additional images to be generated may be set by the manufacturer with the appropriate number corresponding to each scene category (i.e., a default number), or may be directly set by the user through the user interface.

In such a case, the number of additional images to be generated may be directly set by the user through the user interface.

In this case, the control unit 140 may apply image processing technologies having high priority from the plurality of image processing technologies belonging to each scene sequentially, and generate the designated number of additional images. In this case, the order of priority may be set by default or may be determined by applying a weighted value according to a predetermined algorithm. For example, the order of priority may be determined in the order that the manufacturer or program developer determined to be appropriate to express the image in the corresponding scene category.

Otherwise, the control unit 140 may count the number of additional images (that is, applied image processing technologies) deleted in the playback mode, and apply the order of priority to the image processing technology based on the counted number, with the smallest counted number having the highest priority (i.e., a higher counted number corresponds to a lower priority). In some cases, when the number of deleted additional images exceeds a predetermined counting number, the control unit 140 may not apply the corresponding image processing technology when creating an additional image. That is, even when the predetermined or designated number has not been reached, the control unit 140 may not apply the corresponding image processing technology to generate additional images.

Otherwise, the control unit 140 may apply the randomly selected image processing technology sequentially and to generate the designated number of additional images.

In addition, the control unit 140 may control the display unit 130 to display the original image generated in the photographing unit 120 and at least one additional image on one screen according to a predetermined event. More specifically, the control unit 140 may display the original image photographed based on the input image on one area of the replay screen in the playback mode, and display the additional image where image processing corresponding to the determined scene category on the remaining area. In some cases, it is possible for the control unit 140 to control the display unit 130 to display the original image and the at least one additional image on the screen together just after the photographing has been performed. In addition, in some cases, the control unit 140 may display the original image in a playback mode, and display the additional image sequentially.

Figure 2:
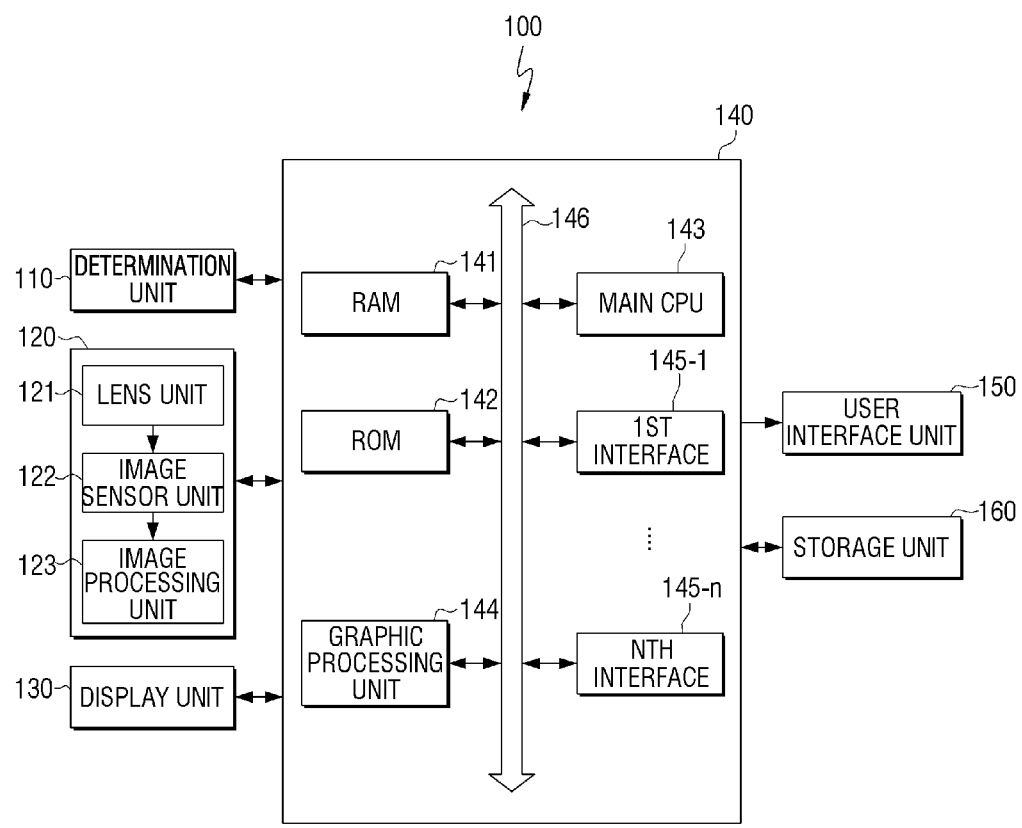
FIG. 2 is a block diagram illustrating a detailed configuration of the photographing apparatus illustrated in FIG. 1, according to an exemplary embodiment.
Figure 7:
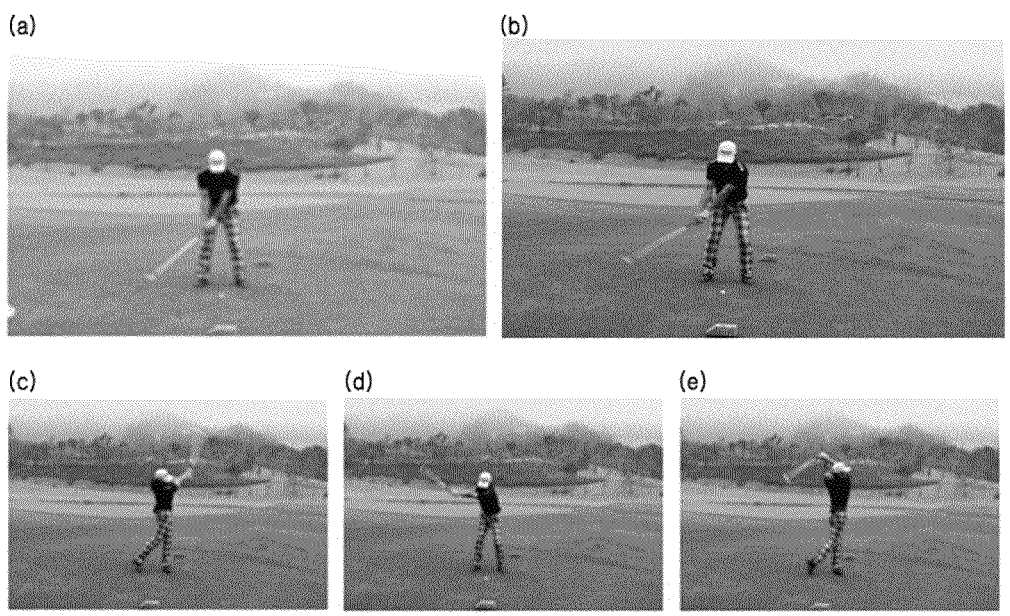
Figure 8:
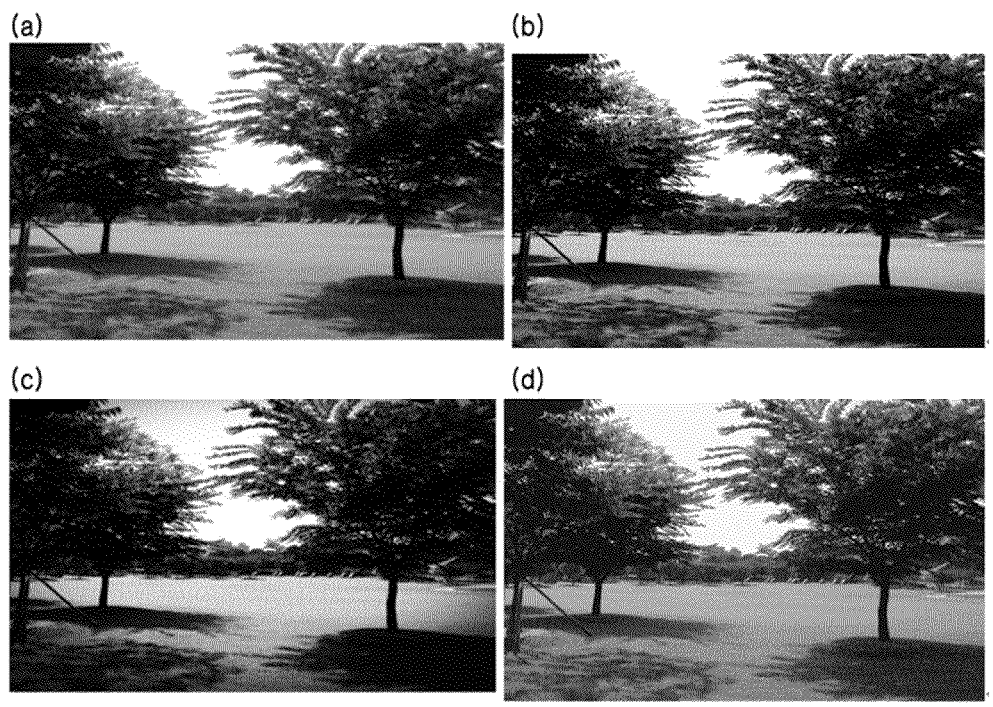

FIG. 2 is a block diagram illustrating a detailed configuration of the photographing apparatus illustrated in FIG. 1, according to an exemplary embodiment. According to FIG. 2, the photographing apparatus 100 includes a determination unit 110, photographing unit 120, display unit 130, control unit 140, user interface unit 150 and storage unit 160. Detailed explanation on the configurative elements of FIG. 1 repeated in FIG. 2 will be omitted.

The photographing unit 120 may include a lens unit 121, image sensor 122 and image processing unit 123.

The lens unit 121 receives a light signal regarding the subject. As such, the lens unit 121 which receives the light signal regarding the subject may be a lens of an aperture type which protrudes externally or may be a lens using an inner zoom method which protrudes internally. Not only that, the lens unit 121 may be a detachable lens such as a lens for a DSLR camera.

When the light signal regarding the subject is received through the lens unit 121, the image sensor 122 converts the light signal regarding the subject received through the lens unit 121 using a photographing device such as a CCD (Charge Coupled Device) or CMOS (Complementary Metal Oxide Semiconductor), performs signal processing, and then outputs the processed image signal to the image processing unit 123. Accordingly, the image processing unit 123 performs signal processing on the image signal output from the image sensor 122, and then creates a processed image signal.

When a data signal regarding the created image is input through the image sensor 122, the image processing unit 123 may convert the corresponding data signal to digital image data through analog/digital conversion.

In addition, the image processing unit 123 may perform digital signal processing such as gamma correction and white balance adjustment, etc., on digital image data and provide the processed digital image data to the display unit 130.

In some cases, the image processing unit 123 may perform processing to change the image resolution. For example, when replaying an image file stored according to a user command (for example, playback mode), when necessary, it is possible to perform processing to change the resolution of the image. Herein, resolution refers to an image size may be, for example, 640×480, 800×600, 1024×768, 1050×790, or 1280×960, or other image resolution known in the art.

Meanwhile, the display unit 130 may be embodied as a LCD (Liquid Crystal Display) panel, or OLED (Organic Light Emitting Diodes), etc., but it is not limited thereto. The display unit 130 may be embodied as a touch screen format forming a multiple layer structure with the touch pad. In such a case, the display unit 130 may be used as a user interface unit 150 (to be explained hereinafter) in addition to an output device. Herein, the touch screen may be configured to detect not only the location and size area of the touch input but also the touch input pressure.

The user interface unit 150 receives various user commands.

More specifically, the user interface unit 150 may be embodied in various formats, for example, a key panel which has various manipulating keys for receiving user manipulations, or a touch panel which receives user touch manipulations. In this case, an electrical signal corresponding to the user manipulation input through the key panel or touch panel may be generated and provided to the control unit 140.

The control unit 140 may control the photographing apparatus 100 to generate an additional image where image processing has been performed corresponding to the determined scene category.

More specifically, the control unit 140 may control a lens driving unit (not illustrated), aperture driving unit (not illustrated), photographing device controller (not illustrated) to adjust the location of the lens, the opening of the aperture, and the sensitivity of the image sensor, etc., to generate an additional image where image processing corresponding to the determined scene category has been performed on the input image.

In addition, the control unit 140 may post-process the original image corresponding to the determined scene category to generate an additional image, as aforementioned.

The operations of the aforementioned control unit 140 may be made by the program stored in the storage unit 160. In the storage unit 160, an O/S (Operating System) software module for driving the photographing apparatus 100, and various image data created by photographing may be stored. For example, in the storage unit 160, the aforementioned original image data, and additional image data where additional image processing has been performed may be stored, and the photographing images stored in the storage unit 160 may be provided to the user through a playback mode.

Meanwhile, the storage unit 160 may be embodied in various memory formats. For example, the memory which stores photographing images may be embodied in various memory card formats such as CF card, CD card, XD card, and etc.

Other embodiments of the photographing apparatus 100 may include various types of buttons, such as a mechanic button formed in an arbitrary area of the photographing apparatus 100, such as a front, side, or rear area of the exterior of the main body. For example, a button for turning the power of the photographing apparatus 100 ON/OFF may be provided. In addition, the photographing apparatus 100 may perform communication with various external apparatuses through a USB cable, or may include a USB port (not illustrated) for charging the photographing apparatus.

Meanwhile, the control unit 140 may be embodied in a format which includes a RAM 141, ROM 142, main CPU 143, graphic processing unit 144, first to nth interfaces 145-1~145-n, and bus 146.

The RAM 141, ROM 142, main CPU 143, graphic processing unit 144, and 1st to nth interfaces 145-1~145-n etc. may be connected to one another through the bus 146.

The 1st to nth interfaces (145-1 to 145-n) are connected to the aforementioned various configurative elements. One of the interfaces may be a network interface which is connected to an external apparatus through the network.

The main CPU 143 accesses the storage unit 160, and performs booting using the O/S stored in the storage unit 160. In addition, the main CPU 143 performs various operations using various programs, contents, and data stored in the storage unit 160.

In the ROM 142, a command set for system booting is stored. When a turn-on command is input and power is supplied, the main CPU 143 copies the O/S stored in the storage unit 160 into the RAM 141 according to the command stored in the ROM 142, and executes the O/S to boot the system. When the booting is completed, the main CPU 143 copies various programs stored in the storage unit 160 into the RAM 141, and executes the program copied into the RAM 141 to perform various operations.

The graphic processing unit 144 creates a display screen which includes various objects, such as an icon, image, text, using a calculating unit (not illustrated) and rendering unit (not illustrated). The calculating unit (not illustrated) calculates attribute values, such as a coordinate value, format, size, and color, where each object will be displayed according to the layout of the display screen using the received control command. The rendering unit (not illustrated) creates a display screen of various layouts including the various objects based on the attribute values calculated in the calculating unit. The display screen created in the rendering unit (not illustrated) is then displayed within the display area of the display unit 130.

While FIG. 2 is an example of a detailed configuration included in the photographing apparatus 100, in other exemplary embodiments, a portion of the configurative elements illustrated in FIG. 2 may be omitted or changed, or other configurative elements may be further added. For example, a GPS receiver (not illustrated) for receiving a GPS signal from a GPS (Global Positioning System) and for calculating a current location of the photographing apparatus 100 may be further included. In this case, information on a current location calculated when photographing may be tagged in the photographed image data.

FIG. 3 is a set of diagrams illustrating a UI provision method, according to an exemplary embodiment of the present disclosure.

As illustrated in FIG. 3(a), a menu icon 310 for setting a mode for sensitivity image photographing according to the present disclosure may be displayed on a screen which provides a live view.

Accordingly, as illustrated in FIG. 3(b), in a case where a corresponding menu icon 310 is selected and a user command is input (for example photographing button pressing manipulation), image processing corresponding to the aforementioned scene category becomes available to generate not only an original image but also additional images.

Otherwise, it is also possible to set the corresponding mode on a separate menu screen and not on the screen which provides a live view, as illustrated in FIG. 3(c). For example, as illustrated, it is possible to set the corresponding mode through a manipulation of turning ON the "Smart Art" menu 320. In addition, "Smart Auto Mode" may be selected by a step menu provided on the screen or by manipulating a certain hardware button (for example, selecting the menu through a jog wheel).

FIG. 4 is a set of diagrams illustrating a method of providing an additional image, according to an exemplary embodiment of the present disclosure.

As illustrated in FIG. 4, an additional image (420, 450) generated through additional image processing according to an exemplary embodiment of the present disclosure, and the original image (410, 440), may be displayed on one screen together. For example, a corresponding screen may be provided in a playback mode.

More specifically, as illustrated in FIGS. 4(a) and 4(b), on a left area of the screen, an original image 410, 440 of an input image photographed according to an existing setting may be displayed, and on a right area, an additional image 420, 450 photographed by performing image processing corresponding to a scene category where the input image belongs to may be displayed. In addition, on a lower area of the screen, an announcement phrase 430, 460 indicating that the image displayed on the right area is an image created according to the additional image processing may be displayed.

For example, as illustrated in FIG. 4(a), when the input image belongs to the "Landscape category", on a left side of the screen, an original image 410 photographed with a background according to the existing setting may be displayed, and on a right side of the screen, an additional image 420 photographed by performing image processing corresponding to the "Landscape category" may be displayed. In addition, on a lower area, a phrase stating "right is a result of automatically photographing by boosting sensitivity that camera selects, when selecting SmartArt function" may be displayed, which includes an explanation of the image processing performed on the additional image 420 displayed on the right area.

In addition, as illustrated in FIG. 4(b), in a case where an input image belongs to the "motion category", on a left area of the screen, an original image 440 of a moving subject photographed according to an existing setting may be displayed, and on a right area of the screen, a plurality of additional images 450 photographed after performing the image processing corresponding to the "motion category" may be displayed. For example, the plurality of additional images 450 of a moving subject automatically and continuously photographed in order to prevent shaking due to movement may be displayed. In addition, on a lower area, a phrase 460 which states "right is a result of automatically and continuously photographing a subject in order to prevent shaking due to movement, when selecting SmartArt function" may be displayed, which includes an explanation of the image processing performed on the plurality of additional images 450 displayed on the right area.

FIGS. 5 to 8 are diagrams illustrating a photographed result, according to various exemplary embodiments of the present disclosure.

FIG. 5(a) indicate the original image photographed according to the existing setting, and FIG. 5(b) indicate the additional image photographed by applying the setting belonging to the corresponding scene category, in a case where the input image belongs to "Night category." For example, FIG. 5(b) indicates an image photographed after applying the Cross Filter, which is the image processing corresponding to the "Night category," or through a narrowed aperture setting.

FIG. 6(a) indicates an original image photographed according to the existing setting in a case where the input image belongs to the "Portrait category", and FIGS. 6(b) to 6(d) indicate additional images photographed after applying the setting belonging to the corresponding scene category. For example, FIG. 6(b) indicates the additional image photographed through "EV up + Face Beauty Retouch + Tone adjustment," which is the image processing corresponding to the "Portrait category". In addition, FIG. 6(c) indicates the additional image photographed through "EV up + Skin Color adjustment," which is another image processing setting corresponding to the "Portrait category". In addition, FIG. 6(d) is an additional image photographed through "Vignetting," which is another image processing setting corresponding to the "Portrait category."

FIG. 7(a) indicates an original image photographed according to the existing setting in a case where the input image belongs to "Motion category", and FIGS. 7(b) to 7(e) indicate additional images photographed after applying the setting belonging to the corresponding scene category. For example, FIGS. 7(b) to 7(e) indicate additional images photographed through "Shutter speed down + continuous photographing," which is the image processing setting corresponding to the "Motion category".

FIG. 8(a) indicates an image photographed according to the existing setting in a case where the input image belongs to the "Landscape category", and FIGS. 8(b) to 8(d) indicate additional images photographed after applying the setting belongs to the corresponding scene category. For example, FIG. 8(b) indicates an image photographed through "Saturation up," which is an image processing setting corresponding to the "Landscape category". In addition, FIG. 8(c) indicates an image photographed through "Vignetting," which is another image processing setting corresponding to the "Land-scape category". In addition, FIG. 8(d) indicates an image photographed through "Analogue film processing," which is another image processing setting corresponding to the "Landscape category".

Figure 9:
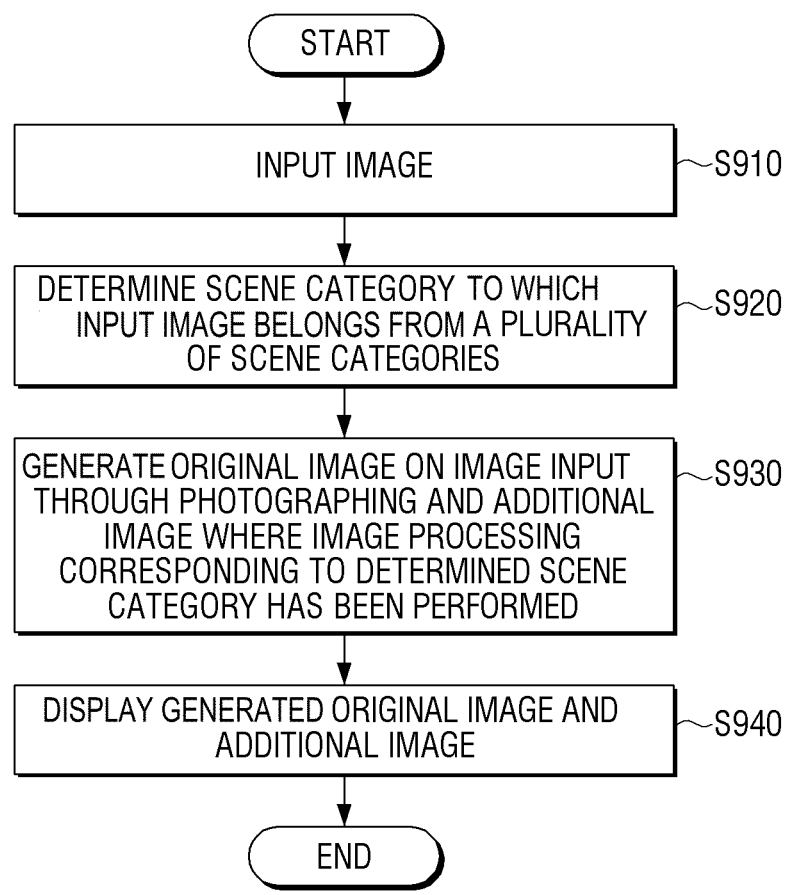
FIG. 9 is a flowchart illustrating a photographing method of a photographing apparatus, according to an exemplary embodiment of the present disclosure.

FIG. 9 is a flowchart illustrating a photographing method of a photographing apparatus, according to an exemplary embodiment of the present disclosure.

According to the photographing method of the photographing apparatus illustrated in FIG. 9, an input image is provided, for example, through a live view (S910). Then, a scene category to which the input image belongs from among a plurality of predetermined scene categories is determined (S920).

Next, an original image of the input image, which is input through photographing, is generated, and an additional image where image processing corresponding to the determined scene category has been performed is also generated (S930).

Next, the generated original image and additional image are displayed according to a predetermined event (S940). Here, in a case where a playback mode is being executed, the predetermined event may be the point where photographing has been completed, but is not limited thereto.

To generate the additional image (S930), the step may be perform by photographing the input image according to the photographing or image processing setting corresponding to the determined scene category. For example, it is possible to generate an original image under an existing condition, change the photographing or image processing setting, and then generate an additional image through a continuous photographing.

In addition, the step of generating the additional image (S930) may be performed by processing the original image using image processing setting corresponding to the determined scene category to generate the additional image.

In addition, the step of generating the additional image (S930) may be additionally performed by performing image processing on an image generated through the continuous photographing. That is, in a case where changing photographing setting and image processing technology for post-processing are all included in the image processing technology which belongs to the corresponding scene category, it is possible to change the photographing setting, apply the image processing technology for post-processing on the photographed image, and generate the additional image.

In addition, the step of generating the additional image (S930) may include determining the number of a plurality of additional images, and performing different image processing corresponding to the determined scene category on the plurality of additional images. In this case, the number of the plurality of additional image may be predetermined, or may be automatically determined based on the number of different image processing setting corresponding to the determined scene category.

In addition, by counting the number additional image that has been deleted, it is possible to set the order of priority for performing image processing when generating the additional image corresponding to the determined scene category in a next photographing operation. More specifically, the priority order may be set such a higher counted number corresponds to lower priority.

For example, it is possible to determine that the additional image having a high deleted number by the user in the playback mode (i.e., the additional image that has been deleted the most times by the user) corresponds to image processing that the user does not prefer. Thus, a low priority order is set for the corresponding image processing when photographing an image belonging to the same scene category in the next photographing operating, or the corresponding image processing may be excluded when generating an additional image.

Figure 10:
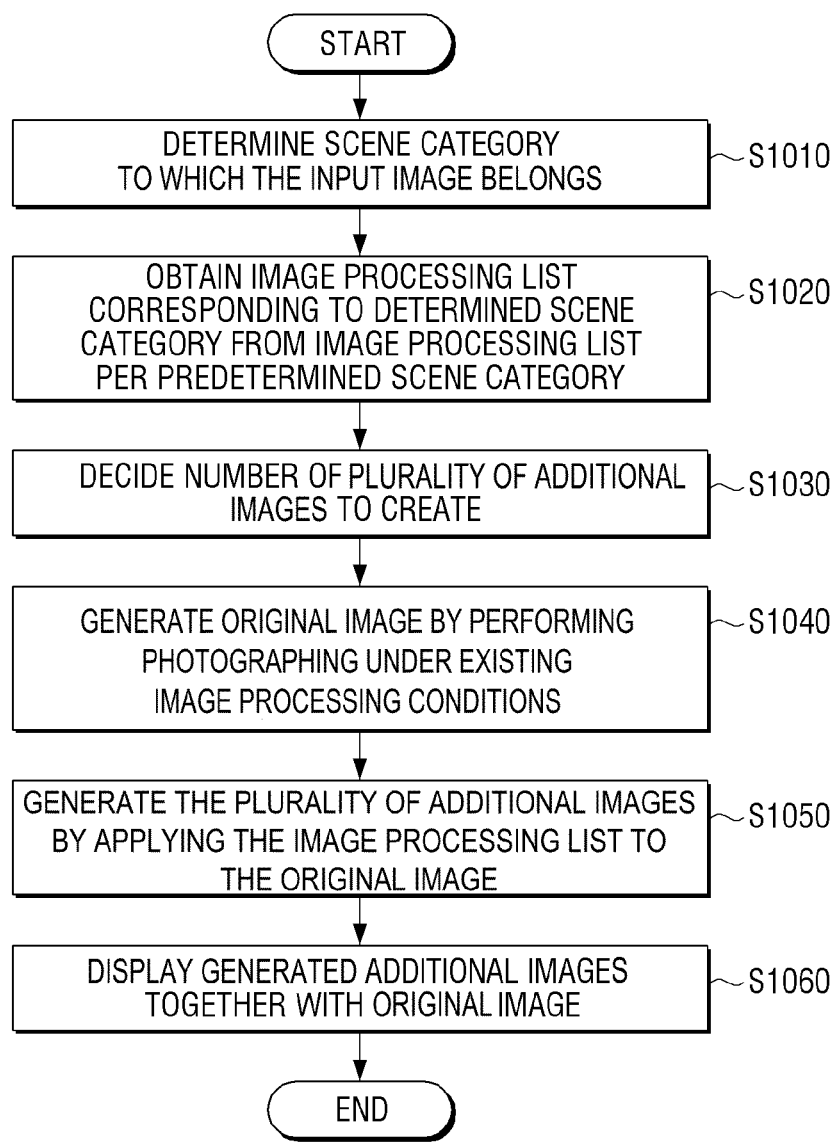
FIG. 10 is a flowchart illustrating a photographing method of a photographing apparatus, according to an exemplary embodiment of the present disclosure.

FIG. 10 is a flowchart illustrating in detail a photographing method of a photographing apparatus, according to an exemplary embodiment of the present disclosure.

According to the photographing method of the photographing apparatus illustrated in FIG. 10, first of all, a scene category to which an input image belongs is determined (S1010). For example, it is possible to analyze an image provided through a live view, and determine a scene category where the input image belongs to.

Next, an image processing list corresponding to the determined scene category is obtained from an image processing list per predetermined scene category (S1020).

In addition, the number of additional images to be generated by applying the image processing technology included in the image processing list is determined (S1030).

Next, an original image is generated by performing photographing under the existing image processing conditions, that is, the photographing conditions set in the current photographing apparatus (S1040).

In addition, the image processing technology included in the image processing list obtained in step S1020 is applied to the original image to generate as many as the number of the additional images determined in step S1030 (S1050). Here, the image processing technology applied to creating a plurality of additional images may be a plurality of different image processing technologies.

Next, at least one of the generated plurality of additional images is displayed together with the original image created in step S1040.

As aforementioned, according to the present disclosure, even if the user doesn't have knowledge of the image processing technology, the camera may automatically apply the appropriate image processing technology to generate an additional image. Thus, it is possible to obtain an image where an appropriate IP (Image Processing) technology has been automatically obtained and applied according to the characteristics of the input image.

Accordingly, even if one does not apply the IP that one wishes to apply with the camera through the menu setting, the camera automatically applies and stores the appropriate IP, and thus it is possible to provide the convenience of not having to perform image editing on the PC or camera.

Meanwhile, a controlling method according to the aforementioned various exemplary embodiments may be embodied as a program and provided in the photographing apparatus.

By way of an example, there may be provided a non-transitory computer readable medium which stores a program which performs a step of determining the scene category to which an input image belongs from among a plurality of predetermined scene categories, a step of generating an original image corresponding to the input image through photographing and an additional image where image processing corresponding to the determined scene category has been performed, and a step of displaying the generated original image and additional image according to a predetermined event.

A non-transitory computer readable medium refers to a medium which stores data semi-permanently and which may be read by apparatuses and not a medium which stores data for a short period of time such as a register, cache, and memory etc. More specifically, the aforementioned various applications or programs may be stored in non-transitory readable medium such as a CD, DVD, hard disk, blu-ray disk, USB, memory card, and ROM etc.

Although a few embodiments of the invention have been shown and described, it would be appreciated by those skilled in the art that changes may be made in this embodiment without departing from the principles and spirit of the invention, the scope of which is defined in the claims and their equivalents.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing apparatus comprising:
   a determination unit which determines a scene category to which an input image belongs from a plurality of predetermined scene categories;
   a photographing unit which photographs the input image;
   a control unit which controls the photographing unit to generate an original image corresponding to the input image and a plurality of additional images by determining a number of the plurality of additional images, performing image processing corresponding to the determined scene category on the input image, and performing different image processing corresponding to the determined scene category to each additional image of the plurality of additional images, respectively; and
   a display unit which displays the generated original image and one or more of the plurality of additional images according to a predetermined event.

2. The photographing apparatus according to claim 1, wherein the control unit controls the photographing unit to generate the plurality of additional images by photographing the input image according to image processing settings corresponding to the determined scene category.

3. The photographing apparatus according to claim 1, wherein the control unit controls the photographing unit to generate the plurality of additional images by performing image processing corresponding to the determined scene category on the original image.

4. The photographing apparatus according to claim 1, wherein the number of the plurality of additional images is either predetermined or automatically determined based on a number of different image processing settings corresponding to the determined scene category.

5. The photographing apparatus according to claim 1, further comprising a counting unit which counts a number of additional images, corresponding respectively to the different image processing, that have been deleted,
   wherein based on the counted number, the control unit sets a priority order for performing image processing when generating the additional image corresponding to the determined scene category in a next photographing operation.

6. The photographing apparatus according to claim 5, wherein the control unit sets the priority order for performing image processing such that a higher counted number corresponds to a lower priority.

7. The photographing apparatus according to claim 1, wherein the determination unit analyzes the input image in a live view mode, and determines the scene category to which the input image belongs.

8. The photographing apparatus according to claim 1, wherein the display unit displays the generated original image and the plurality of additional images together in a playback mode.

9. A photographing method comprising:
   determining a scene category to which an input image belongs from a plurality of predetermined scene categories;
   generating an original image corresponding to the input image through photographing and a plurality of additional images by determining a number of the plurality of additional images, performing image processing corresponding to the determined scene category on the input image, and performing different image processing corresponding to the determined scene category to each additional image of the plurality of additional images, respectively; and
   displaying the generated original image and one or more of the plurality of additional images according to a predetermined event.

10. The photographing method according to claim 9, wherein the generating of the plurality of additional images comprises photographing the input image according to image processing settings corresponding to the determined scene category.

11. The photographing method according to claim 9, wherein the generating of the plurality of additional images comprises performing image processing corresponding to the determined scene category on the original image.

12. The photographing method according to claim 9, wherein the number of the plurality of additional images is either predetermined or automatically determined based on a number of different image processing settings corresponding to the determined scene category.

13. The photographing method according to claim 9, further comprising:
- counting a number of additional images, corresponding to the different image processing, that have been deleted; and
- based on the counted number, setting a priority order for performing image processing when generating the additional image corresponding to the determined scene category in a next photographing operation.

14. The photographing method according to claim 13, wherein the priority order for performing image processing is set such that a higher counted number corresponds to a lower priority.

15. The photographing method according to claim 9, wherein the determining of the scene category comprises:
- analyzing the input image in a live view mode, and
- determining the scene category to which the input image belongs based on analyzing the input image in the live view mode.

16. The photographing method according to claim 9, wherein the displaying comprises displaying the generated original image and the plurality of additional images together in a playback mode.

\* \* \* \* \*